UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF MAKING DIALKYL BARBITURIC ACID.

No. 879,835.     Specification of Letters Patent.     Patented Feb. 18, 1908.

Original application filed July 20, 1906. Serial No. 327,084. Divided and this application filed July 16, 1907. Serial No. 384,079.

*To all whom it may concern:*

Be it known that I, MAX ENGELMANN, doctor of philosophy, chemist, citizen of the German Empire, residing at Elberfeld, Germany, Kingdom of Prussia, have invented new and useful Improvements in Processes of Making Dialkyl Barbituric Acids, of which the following is a specification.

My invention relates to a new process for the manufacture and production of dialkyl barbituric acids (2.4.6-trioxy-5-dialkyl pyrimidins) being as is known valuable soporifics.

This application, which is a divisional application from my application Serial No. 327,084, filed July 20, 1906, covers specifically the process for the production of dialkyl barbituric acids in the presence of carbonic acid derivatives.

The new process consists in heating the dialkyl malonyl diurethanes, having the formula:

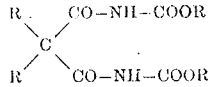

(R meaning alkyl radicals) in the presence of carbonic acid derivatives. The yield of dialkyl barbituric acids can be increased by adding to the reaction mass carbonic acid derivatives, such as urea, diphenyl carbonate, or the like. As far as I could hitherto ascertain, these substances increase the yield, without, however, entering into the reaction. By heating the dialkyl malonyl diurethanes in the presence of carbonic acid derivatives dialkyl barbituric acids and dialkyl carbonates are formed probably according to the following formula:

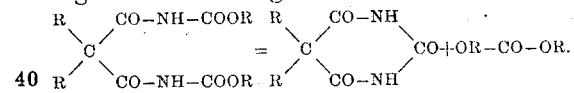

If the thus obtained melt is extracted with boiling water, the dialkyl barbituric acid can be separated from the impurities. However, in order to get the pure dialkyl barbituric acid, it is advantageous to treat the melt for further purification with dilute alkaline solutions. If dilute ammonia is used, then the ammoniacal liquid is filtered from unchanged diurethane, the filtrate boiled to drive off the ammonia, and allowed to cool. On cooling the dialkyl barbituric acid is precipitated.

In order to carry out my process practically I can, for instance, proceed as follows, the parts being by weight:

Example 1. A mixture of 10 parts of diethyl malonyl diurethane with 7 parts of urea is heated to 200 to 205° C. for 5 hours, and the melt is dissolved in an aqueous ammonia solution. This solution is filtered, and the filtrate is freed from ammonia by boiling it. The diethyl barbituric acid separates while cooling. It can be further purified by recrystallization from water.

Example 2. A mixture of 10 parts of dimethyl malonyl diurethane with 15 parts of diphenyl carbonate $(CO_3(C_6H_5)_2)$ is heated to 200 to 210° C. for 5 hours, and the melt is further treated as described in Example 1. Dimethyl barbituric acid is thus obtained.

The process is carried out in an analogous manner for the production of other dialkyl barbituric acids, such as dipropyl barbituric acid, methylethyl barbituric acid, or the like.

Having now described my invention and in what manner the same is to be performed what I claim as new and desire to secure by Letters Patent, is:

1. The process for the production of dialkyl barbituric acids having the above given general formula, which process consists in first heating dialkyl malonyl diurethanes in the presence of carbonic acid derivatives and isolating from the thus obtained melt the resulting 5-dialkyl-2.4.6-trioxypyrimidins, substantially as described.

2. The process for the production of dialkyl barbituric acids, which process consists in first heating dialkyl malonyl diurethanes in the presence of carbonic acid derivatives, dissolving the thus obtained melt in ammonia, filtering the liquid, boiling the filtrate to drive off the ammonia, and crystallizing the resulting 5-dialkyl-2.4.6-trioxypyrimidins therefrom, substantially as described.

3. The process for the production of diethyl barbituric acid, having the above given general formula, which process consists in first heating diethyl malonyl diurethanes in the presence of carbonic acid derivatives, and isolating from the thus obtained melt the resulting 5-diethyl-2.4.6-trioxypyrimidin, substantially as described.

4. The process for the production of diethyl barbituric acid, which process consists in first heating diethyl malonyl diurethanes in the presence of carbonic acid derivatives, dissolving the thus obtained melt in ammonia, filtering the liquid, boiling the filtrate, to drive off the ammonia, and crystallizing the resulting 5-diethyl-2.4.6-trioxypyrimidin therefrom, substantially as described.

In testimony whereof I have hereunto set my hand in the presence of two subscribing witnesses.

MAX ENGELMANN. [L. s.]

Witnesses:
 OTTO KÖNIG,
 EWALD PRANTZ.